United States Patent
Choi

(10) Patent No.: US 8,403,357 B2
(45) Date of Patent: Mar. 26, 2013

(54) PASSENGER AIR-BAG DOOR

(75) Inventor: Jae Seob Choi, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 171 days.

(21) Appl. No.: 13/027,841

(22) Filed: Feb. 15, 2011

(65) Prior Publication Data

US 2012/0126514 A1 May 24, 2012

(30) Foreign Application Priority Data

Nov. 22, 2010 (KR) .................... 10-2010-0116494

(51) Int. Cl.
*B60R 21/215* (2006.01)
*B60R 21/217* (2011.01)

(52) U.S. Cl. .................. 280/728.2; 280/728.3; 280/732

(58) Field of Classification Search ............... 280/728.2, 280/728.3, 732
See application file for complete search history.

(56) References Cited

U.S. PATENT DOCUMENTS

| | | | | |
|---|---|---|---|---|
| 5,346,249 A * | 9/1994 | Hallard et al. | ............ | 280/728.3 |
| 5,393,089 A * | 2/1995 | Pakulsky et al. | ........... | 280/728.3 |
| 5,584,502 A * | 12/1996 | Phillion et al. | ............ | 280/728.3 |
| 5,639,115 A * | 6/1997 | Kelley et al. | ............... | 280/728.3 |
| 5,685,930 A * | 11/1997 | Gallagher et al. | .......... | 156/73.1 |
| 5,997,030 A * | 12/1999 | Hannert et al. | ........... | 280/728.3 |
| 7,651,122 B2 | 1/2010 | Kim | | |
| 7,658,404 B2 * | 2/2010 | Sadano et al. | ................ | 280/732 |
| 7,862,072 B2 * | 1/2011 | Grems et al. | ............... | 280/728.3 |
| 2002/0005630 A1 * | 1/2002 | Suzuki et al. | .............. | 280/728.3 |
| 2005/0127641 A1 * | 6/2005 | Cowelchuk et al. | ....... | 280/728.3 |
| 2005/0269804 A1 * | 12/2005 | Yamada et al. | ........... | 280/728.3 |
| 2009/0134608 A1 * | 5/2009 | Kang | ........................ | 280/728.3 |
| 2010/0230938 A1 | 9/2010 | Mazzocchi et al. | | |
| 2011/0148079 A1 * | 6/2011 | Dargavell et al. | ......... | 280/728.3 |

* cited by examiner

*Primary Examiner* — Ruth Ilan
*Assistant Examiner* — Darlene P Condra
(74) *Attorney, Agent, or Firm* — Saliwanchik, Lloyd & Eisenschenk

(57) ABSTRACT

The present disclosure provides a passenger air-bag door. The passenger air-bag door includes a chute frame located in an instrument panel, a door plate located in an opening of the chute frame, and a hinge part rotatably connecting the door plate to the chute frame and comprising a scrim.

17 Claims, 12 Drawing Sheets

PASSENGER AIR-BAG DOOR

CROSS-REFERENCE TO RELATED APPLICATION

This application claims the benefit under 35 U.S.C. §119(a) of Korean Patent Application No. 10-2010-0116494, filed on Nov. 22, 2010, which is hereby incorporated by reference in its entirety.

TECHNICAL FIELD

The present disclosure relates to air-bag doors and, more particularly, to a passenger air-bag door that allows complete deployment of an air-bag door by preventing damage of a hinge part.

DESCRIPTION OF THE RELATED ART

Generally, a vehicle is provided with an air-bag module for protecting a driver or passenger upon collision.

A passenger air-bag module is installed in an instrument panel located in front of a passenger seat. In the passenger air-bag module, an air-bag door must be deployed when external impact is applied thereto. Thus, a cutting groove is formed along a portion of the instrument panel corresponding to an edge of the air-bag door by various processing techniques such as laser scoring or the like. The cutting groove is formed so as not to be visible from the outside in consideration of the aesthetics of the instrument panel.

It should be noted that the above description is provided for understanding of the background art and is not a description of a well-known conventional technique to which the present disclosure pertains.

Conventionally, the passenger air-bag module frequently suffers from incomplete deployment of the air-bag door due to failure of a hinge part which connects a chute frame and a door plate.

Therefore, there is a need for an improved passenger air-bag that does not suffer from such a problem.

BRIEF SUMMARY

To improve upon the art and address one or more of the needs outlined above, the present disclosure provides a passenger air-bag door that allows complete deployment of an air-bag door by preventing damage of a hinge part.

In accordance with one aspect, a passenger air-bag door includes: a chute frame located in an instrument panel; a door plate located in an opening of the chute frame; and a hinge part rotatably connecting the door plate to the chute frame. The hinge part is composed of a scrim.

The scrim may include a first side section provided to the chute frame by insert-injection molding, a second side section provided to the door plate by insert-injection molding, and a middle section between the first side section and the second side section to constitute the hinge part.

The first side section of the scrim may have a greater width than the middle section of the scrim.

The first side section of the scrim may be located at an inner center of the chute frame.

The first side section of the scrim may be located at the inner center of the chute frame by an upper frame protrusion protruding from an upper frame mold forming an upper side of the chute frame and a lower frame protrusion protruding from a lower frame mold forming a lower side of the chute frame.

The chute frame may have a corrugated cross-section.

The chute frame may include upper and lower valleys to form a corrugated cross-section, and the first side section of the scrim may be exposed outside at the upper and lower valleys.

The first side section of the scrim may be exposed to an outside of the chute frame by a frame mold disposed at one side to form one side of the chute frame and by a protrusion protruding from a frame mold disposed at the other side to form the other side of the chute frame.

The second side section of the scrim may be located at an inner center of the door plate.

The second side section of the scrim may be located at the inner center of the door plate by an upper door protrusion protruding from an upper door mold forming, an upper side of the door plate and a lower door protrusion protruding from a lower door mold forming a lower side of the door plate.

The door plate may have a corrugated cross-section.

The door plate may include upper and lower valleys to form a corrugated cross-section, and the second side section of the scrim may be exposed outside at the upper and lower valleys.

The second side section of the scrim may be exposed outside of the door plate by a door mold disposed at one side to form one side of the door plate and by a door protrusion protruding from a door mold disposed at the other side to form the other side of the door plate.

The door plate may be made of a different material than the chute frame.

The door plate may be made of a softer material than the chute frame.

The hinge part may have a length (H) greater than or equal to the sum of a distance (A1) from the first side section of the scrim to an upper side of the chute frame, a thickness (A2) of the instrument panel at a side of the chute frame, a distance (B1) from the second side section of the scrim to an upper side of the door plate, and a thickness (B2) of the instrument panel at a side of the door plate.

The sum of a length (H) of the hinge part and a length (D) of the door plate may be less than the sum of a distance (A1) from the first side section of the scrim to an upper side of the chute frame, a thickness (A2) of the instrument panel at a side of the chute frame, and a distance (C) from a first cutting groove to a front windshield glass.

The scrim may comprise polyester.
The scrim may comprise nylon.

BRIEF DESCRIPTION OF THE DRAWINGS

The above and other aspects, features and advantages of the present disclosure will become apparent from the following description of embodiments given in conjunction with the accompanying drawings, in which.

DETAILED DESCRIPTION

Figure 1:
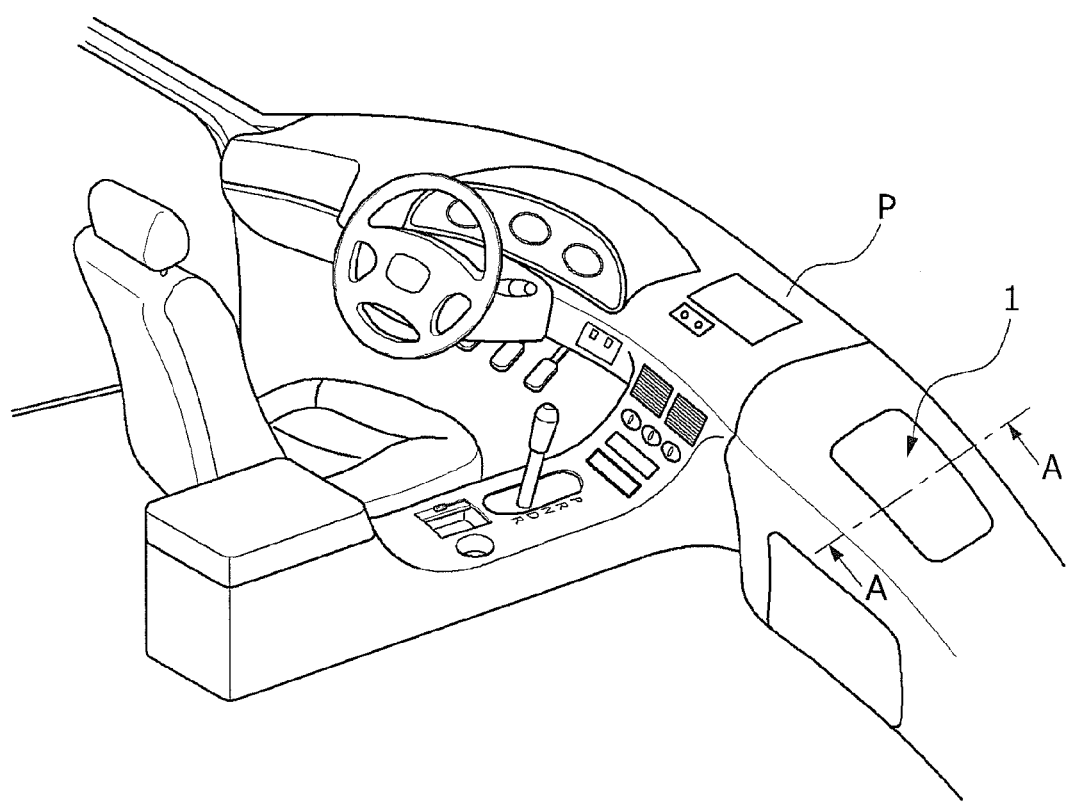
FIG. 1 is a perspective view of an instrument panel of a vehicle.
Figure 2:
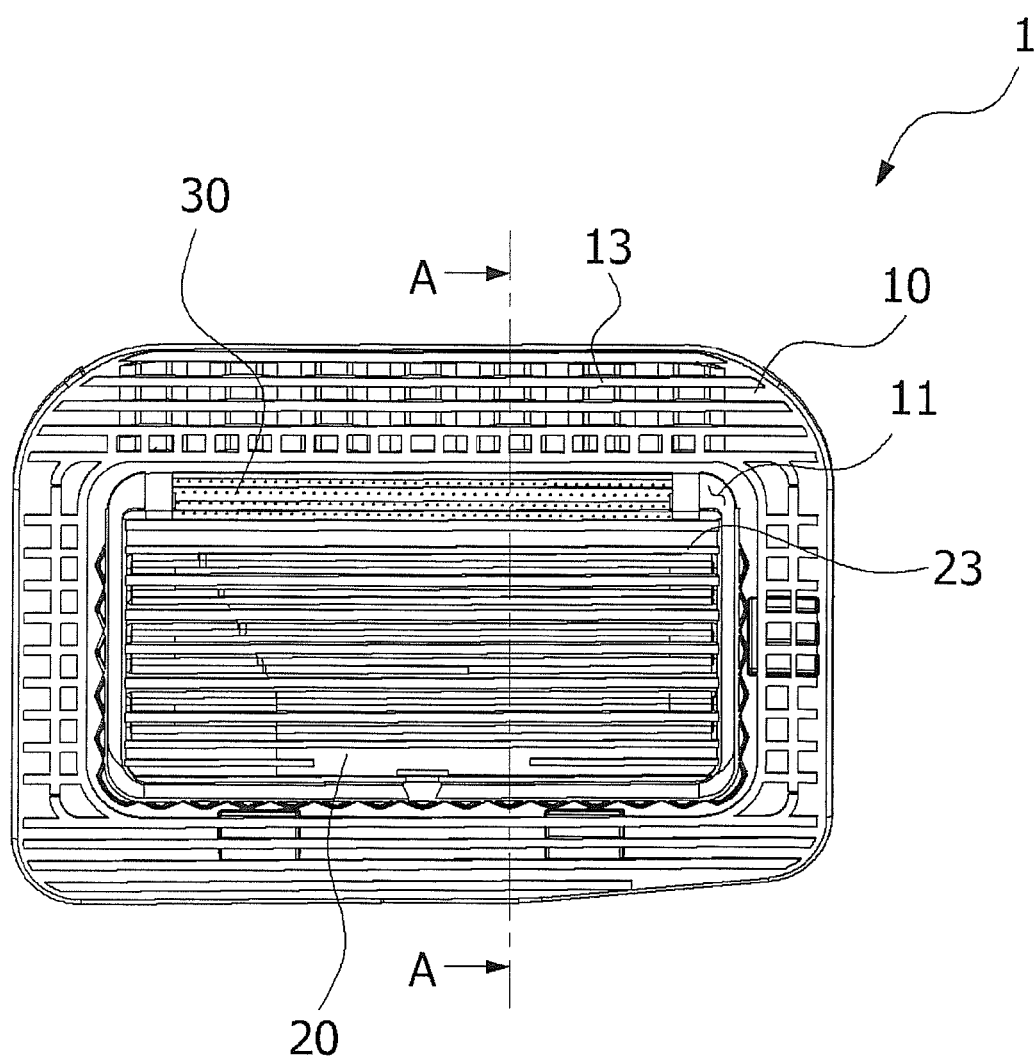
FIG. 2 is a plan view of a passenger air-bag door according to one exemplary embodiment of the present disclosure.
Figure 3:
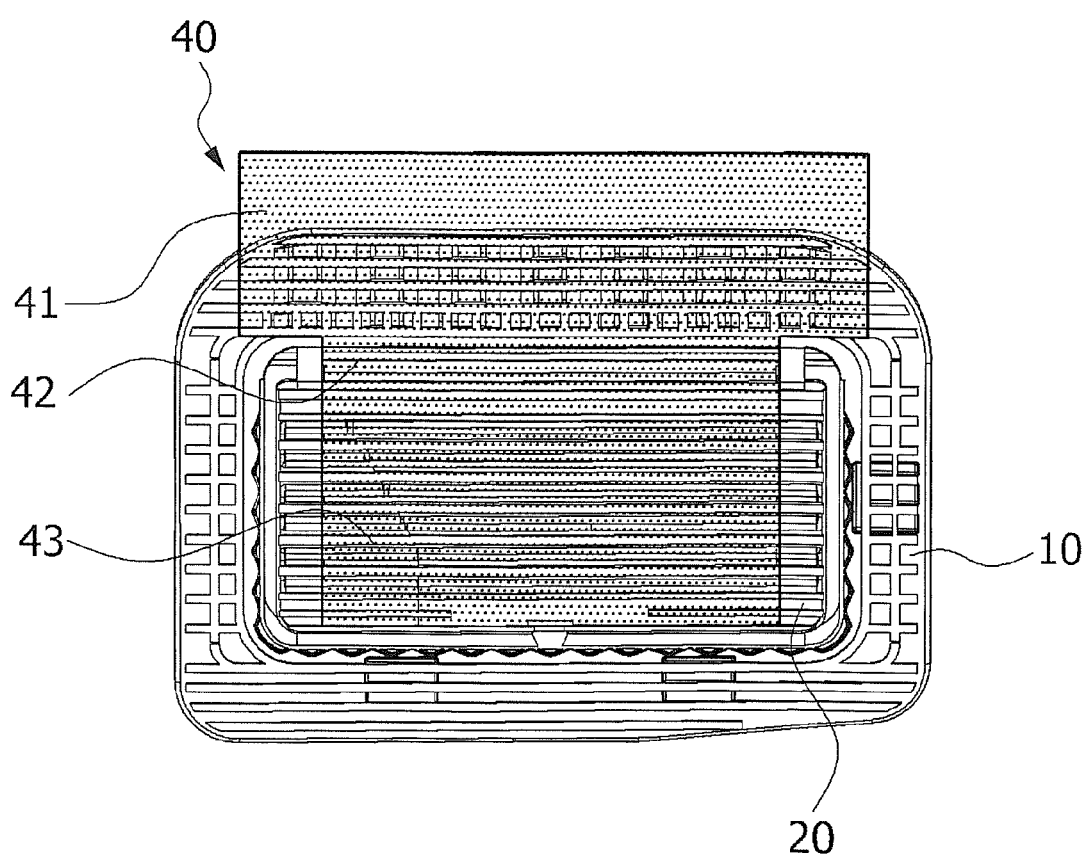
FIG. 3 illustrates a scrim of the passenger air-bag door according to the exemplary embodiment of the present disclosure.
Figure 4:
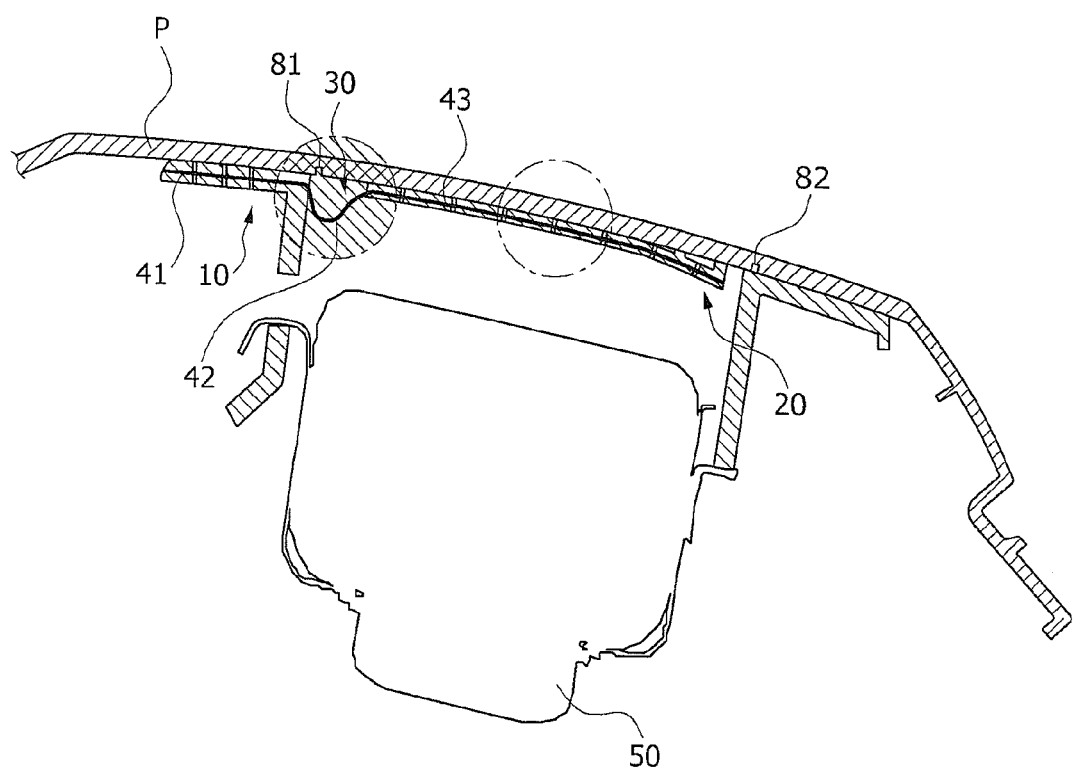
FIG. 4 is a cross-sectional view taken along line A-A of FIG. 2.
Figure 5:
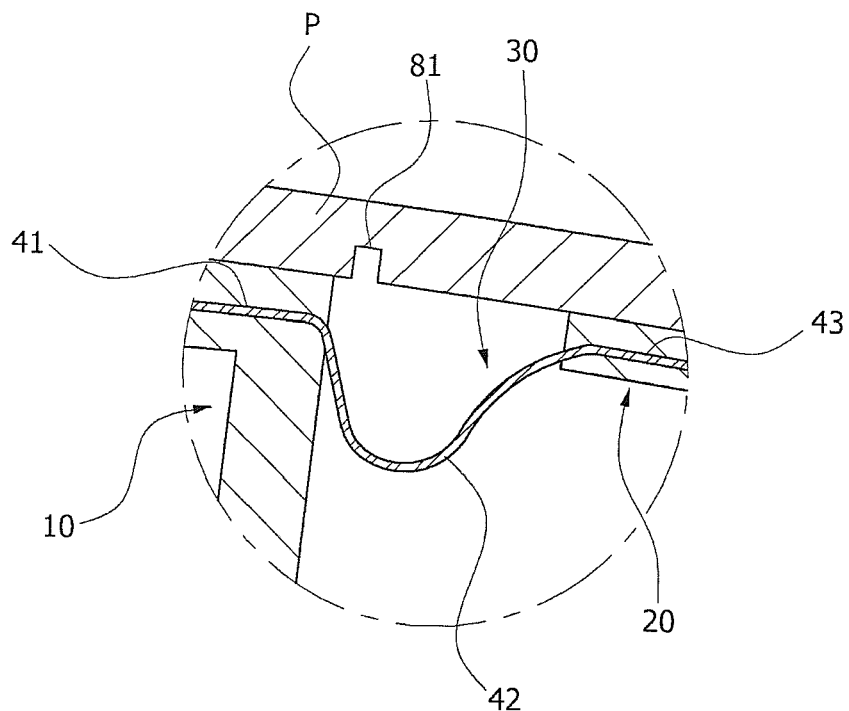
FIG. 5 is an enlarged view of a hinge part of FIG. 4.
Figure 6:
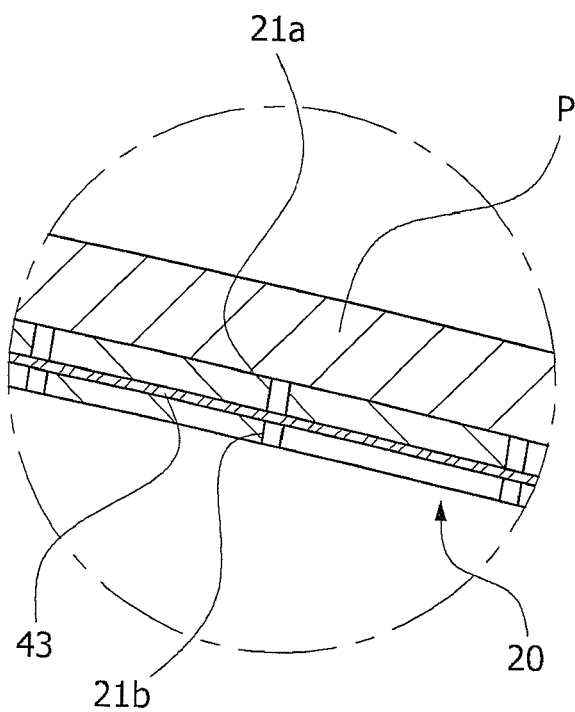
FIG. 6 is an enlarged view of a door plate of FIG. 4.

Exemplary embodiments of the present disclosure will now be described in detail with reference to the accompanying drawings. It should be noted that the drawings are not to precise scale and may be exaggerated in thickness of lines or size of components for descriptive convenience and clarity only.

Furthermore, terms used herein are defined by taking functions of the present disclosure into account and can be changed according to the custom or intention of users or operators. Therefore, definition of the terms should be made according to the overall disclosure set forth herein.

Referring to FIGS. 1 to 4, a passenger air-bag door 1 according to one exemplary embodiment includes a chute frame 10, a door plate 20, a hinge part 30, and an air-bag 50.

The chute frame 10 is disposed under an instrument panel P. The chute frame 10 is secured to the instrument panel P through vibration fusion ribs 13 by vibration fusion attachment. The chute frame 10 has an opening 11 defined at a central region thereof such that the door plate 20 can be disposed in the opening 11.

The door plate 20 is disposed in the opening 11 of the chute frame 10. The door plate 20 is secured to the instrument panel P through the vibration fusion ribs 23 by vibration fusion attachment.

The door plate 20 is rotated about the hinge part 30 upon deployment of the air bag 50. In this case, the door plate 20 is rotated open while tearing a portion of the instrument panel P at a side of the door plate 20. To ensure rapid and precise rotational opening of the door plate 20, the instrument panel P is formed with a cutting line corresponding to the shape of the door plate 20.

The hinge part 30 rotatably connects the door plate 20 to the chute frame 10. The door plate 20 is connected to the chute frame 10 via the hinge part 30.

Referring to FIGS. 3 to 6, the hinge part 30 is composed of a scrim 40. With this configuration, the door plate 20 is rotated open without damage of the hinge part 30 upon deployment of the air bag 50.

The scrim 40 includes a first side section 41, a middle section 42 and a second side section 43. In the scrim 40, the first side section 41 is located at a side of the chute frame 10, the second side section 43 is located at a side of the door plate 20, and the middle section 42 is located between the first and second side sections 41, 43 to constitute the hinge part 30.

The first side section 41 of the scrim 40 is provided to the chute frame 10 by insert-injection molding. This configuration may prevent the first side section 41 of the scrim 40 from being detached from the chute frame 10 when the door plate 20 is rotated open.

The first side section 41 of the scrim 40 is located at an inner center of the chute frame 10 by insert-injection molding. With this configuration, it is possible to prevent separation of the first side section 41 of the scrim 40 from the chute frame 10 upon deployment of the air-bag 50 at high temperature.

Figure 14:
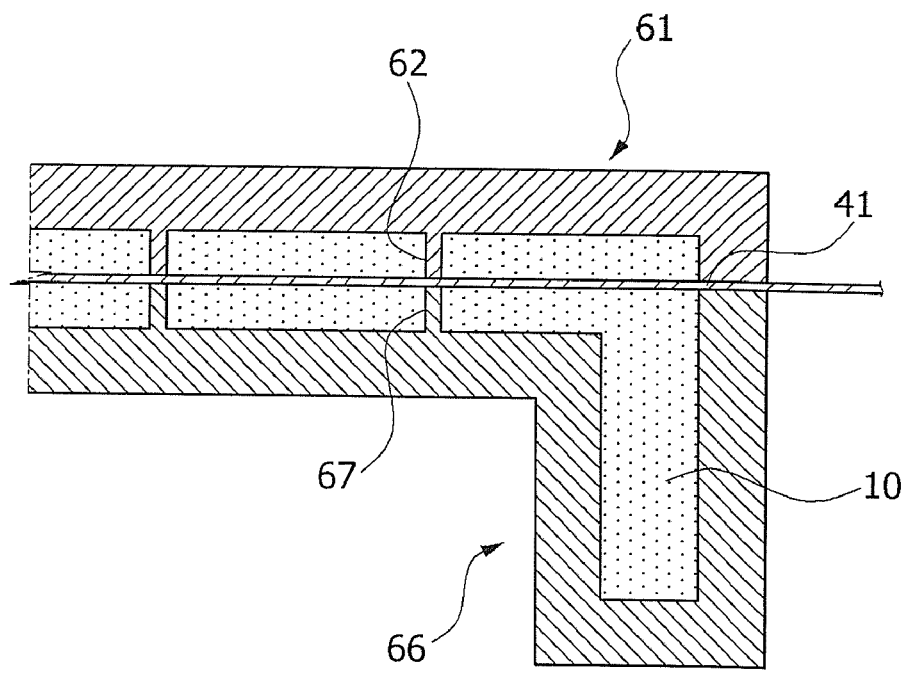
FIG. 14 is a cross-sectional view of a scrim provided to a chute frame by insert-injection molding, according to one exemplary embodiment of the present disclosure.

Referring to FIG. 14, the first side section 41 of the scrim 40 may be secured by upper frame protrusions 62 protruding downwards from an upper frame mold 61 forming an upper side of the chute frame 10 and lower frame protrusions 67 protruding upwards from a lower frame mold 66 forming a lower side of the chute frame 10. Accordingly, the first side section 41 of the scrim 40 may be located at the inner center of the chute frame 10 during insert-injection molding of the first side section 41 to the chute frame 10. The upper and lower frame protrusions 62, 67 form a plurality of holes in the chute frame 10.

Referring to FIGS. 3 to 6, the second side section 43 of the scrim 40 is provided to the door plate 20 by insert-injection molding. This configuration may prevent the second side section 43 of the scrim 40 from being detached from the door plate 20 when the door plate 20 is rotated open.

The second side section 43 of the scrim 40 is located at the inner center of the door plate 20 by insert-injection molding. With this configuration, it is possible to prevent separation of the second side section 43 of the scrim 40 from the door plate 20 upon deployment of the air-bag 50 at high temperature.

Figure 15:
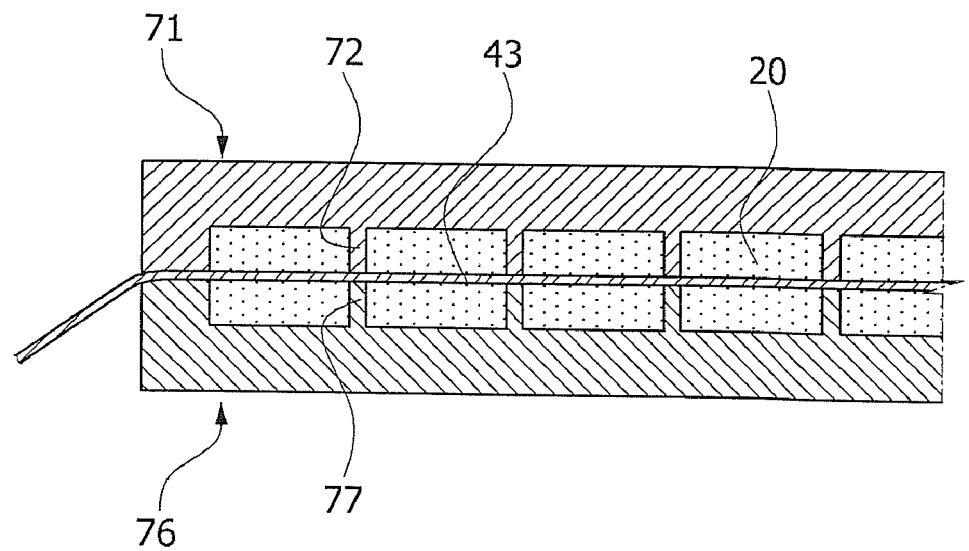
FIG. 15 is a cross-sectional view of the scrim provided to a door plate by insert-injection molding, according to the exemplary embodiment of the present disclosure.

Referring to FIG. 15, the second side section 43 of the scrim 40 is secured by upper door protrusions 72 protruding downwards from an upper door mold 71 forming an upper side of the door plate 20 and lower door protrusions 77 protruding upwards from a lower door mold 76 forming a lower side of the door plate 20. With this configuration, the second side section 43 of the scrim 40 may be located at the inner center of the door plate 20 during insert-injection molding of the second side section 43 to the door plate 20. The upper and lower door protrusions 72, 77 form a plurality of positioning holes 21a, 21b in the door plate 20.

Referring to FIGS. 3 to 6, the middle section 42 of the scrim 40 is disposed between the first side section 41 and the second side section 43 to connect the first and second side sections 41, 43 to each other. The middle section 42 of the scrim 40 refers to a portion of the scrim 40 except for the first side section 41 inserted into the chute frame 10 and the second side section 43 inserted into the door plate 20. Accordingly, the portion of the scrim 40 acting as the hinge part 30 is the middle section 42 of the scrim 40.

The first side section 41 of the scrim 40 has a greater width than the middle section 42 of the scrim 40. Further, the first side section 41 of the scrim 40 has a greater width than the second side section 43 of the scrim 40. In this embodiment, the scrim 40 generally has a T shape. Alternatively, the scrim 40 may have a rectangular shape such that the first side section 41, the middle section 42, and the second side section 43 have the same width.

Since the first side section 41 of the scrim 40 has a greater width than the middle section 42 of the scrim 40 acting as the hinge part 30, it is possible to prevent a portion connecting the middle section 42 to the first side section 41 from being torn even when the door plate 20 is abruptly rotated open.

The scrim 40 comprises polyester in order to allow the middle section 42 to act as the hinge part 30 while preventing the middle section 42 from being torn upon deployment of the air-bag 50. Alternatively, the scrim 40 may comprise nylon.

The chute frame 10 and the door plate 20 are made of different materials. Specifically, since the door plate 20 is made of a softer material than the chute frame 10, the door plate 20 is not damaged when colliding with the instrument panel P.

In this embodiment, the door plate 20 comprises thermoplastic olefin (TPO) and the chute frame 10 comprises polypropylene fumarate (PPF).

Figure 7:
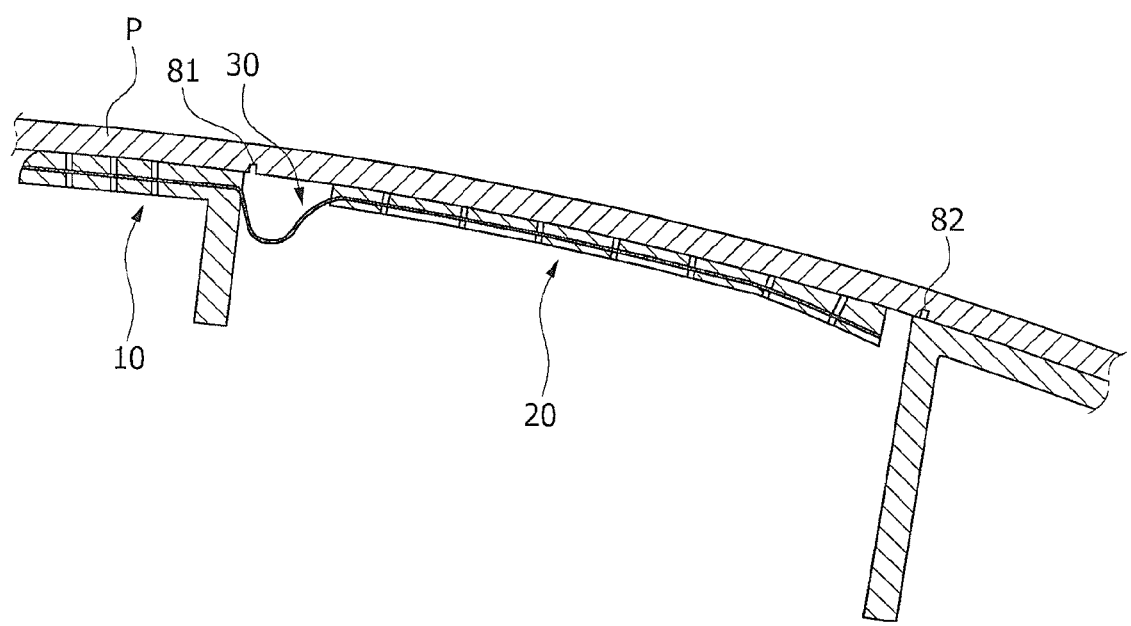
FIG. 7 is a sectional view of the door plate before the door plate is rotated open from the passenger air-bag door according to the exemplary embodiment of the present disclosure.
Figure 8:
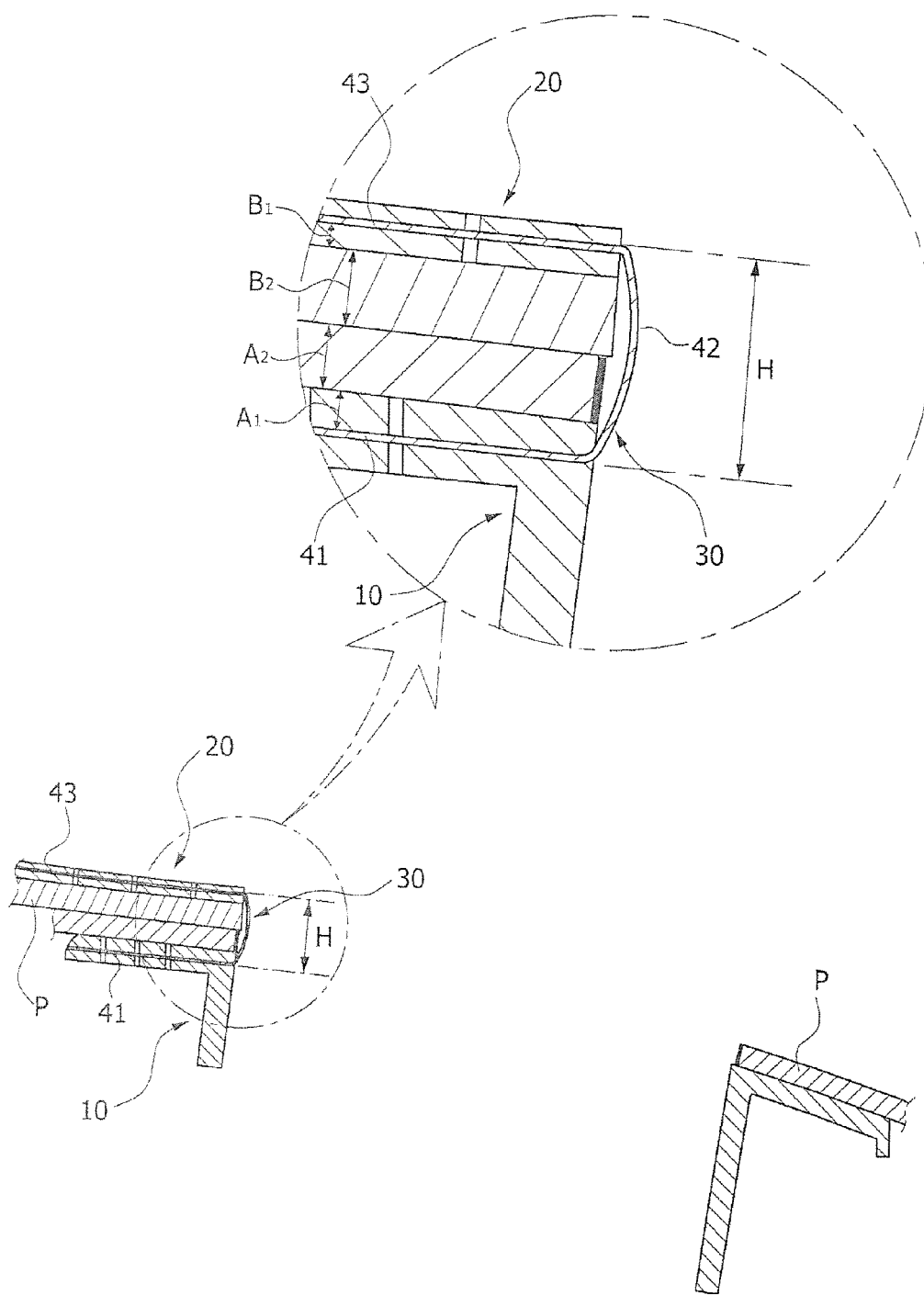
FIG. 8 is a sectional view of the door plate after the door plate is rotated open from the passenger air-bag door according to the exemplary embodiment of the present disclosure.
Figure 9:
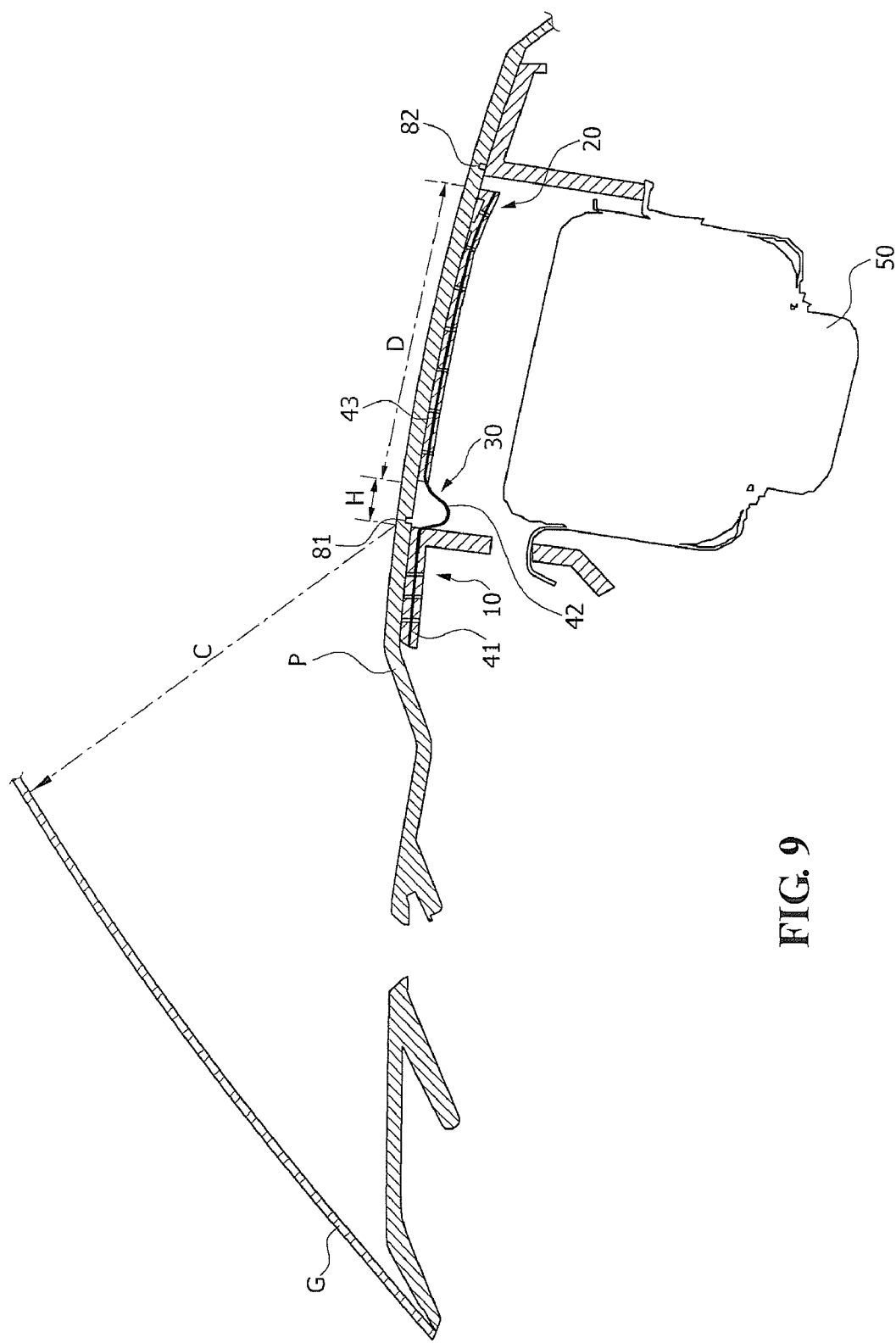
FIG. 9 illustrates a relationship between the hinge part and the door plate in the passenger air-bag door according to the exemplary embodiment of the present disclosure.

Referring to FIGS. 7 to 9, deployment of the passenger air-bag door according to the embodiment will be described.

Upon external collision such as collision between vehicles, the passenger air-bag door 1 is changed from a state shown in FIG. 7 to a state shown in FIG. 8. As the air-bag 50 is deployed, the door plate 20 begins to rotate open. In this case, the instrument panel P is torn along first and second cutting grooves 81, 82, which are formed in the instrument panel P while surrounding the door plate 20, and the door plate 20 is rotated about the hinge part 30.

When the door plate 20 is rotated open, the middle section 42 of the scrim 40 acts as the hinge part 30, thereby solving the problem of the conventional hinge part, which is made of a plastic material and is likely to be damaged or torn by abrupt rotation of the door plate 20. The hinge part 30 may have a sufficient length to allow complete rotation of the door plate 20 with respect to the chute frame 10.

In this embodiment, the hinge part 30 has a length (H) greater than or equal to the sum of a distance (A1) from the first side section 41 of the scrim 40 to an upper side of the chute frame 10, a thickness (A2) of the instrument panel P at a side of chute frame 10, a distance (B1) from the second side section 43 of the scrim 40 to an upper side of the door plate 20, and a thickness (B2) of the instrument panel P at a side of the door plate 20 (see FIG. 8). If the length (H) of the hinge part 30 is less than the sum of these values, the door plate 20 cannot be completely opened by 180 degrees about the hinge part 30. Therefore, it is desirable that the length of hinge part 30 be greater than or equal to the sum (A1+A2+B1+B2) of these values.

If the hinge part 30 is excessively long, the door plate 20 is likely to collide with a front windshield glass (G) while being rotated open. Thus, it is desirable that the sum of the length (H) of the hinge part 30 and the length (D) of the door plate 20 be less than the sum of the length (A1) from the first side section 41 of the scrim 40 to an upper side of the chute frame 10, the thickness (A2) of the instrument panel P at the side of the chute frame 10, and a distance (C) from the first cutting groove 81 to the front windshield glass G. Alternatively, the length (D) of the door plate 20 may be defined as a distance between one end of the door plate 20 to the second cutting groove 82 formed at the other end of the door plate 20.

Figure 10:
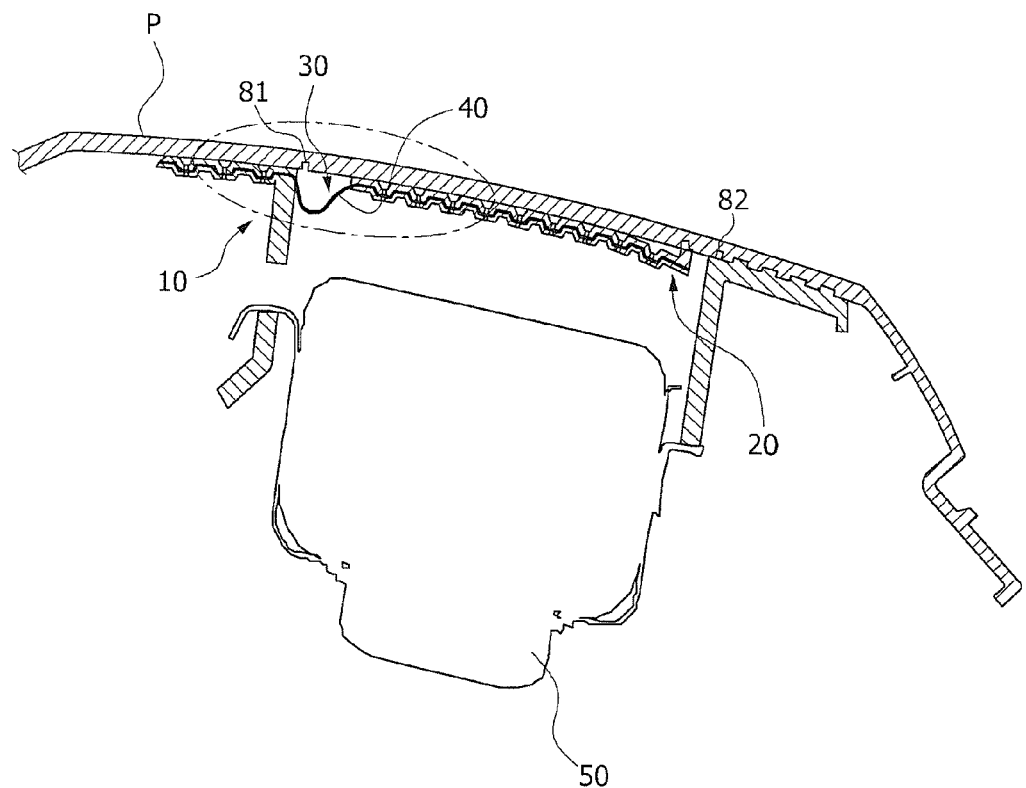
FIG. 10 is a cross-sectional view of a passenger air-bag door according to another exemplary embodiment of the present disclosure.
Figure 11:
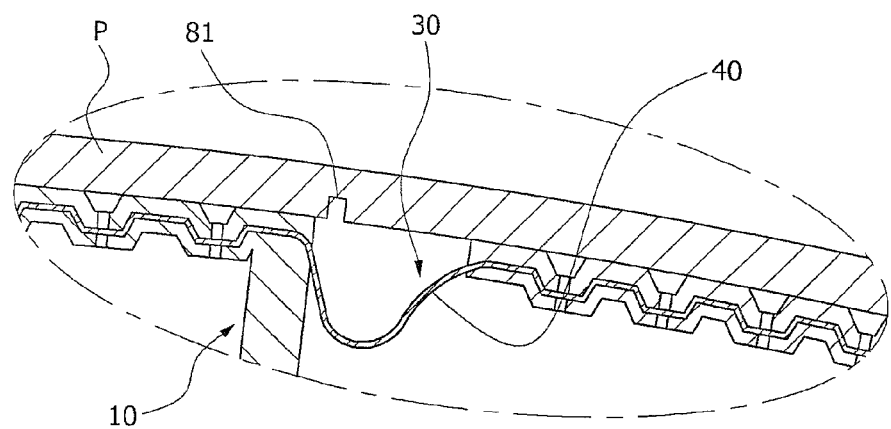
FIG. 11 is a partially enlarged view of the passenger air-bag door of FIG. 10.

FIGS. 10 and 11 illustrate a passenger air-bag door according to another exemplary embodiment. The passenger air-bag door of this embodiment has the same configuration as that of the above embodiment except for a chute frame 10 and a door plate 20.

In this embodiment, the chute frame 10 has a corrugated cross-section. With this configuration, the chute frame 10 has improved strength over the case where the chute frame has a planar cross-section and is not easily bent in one direction by impact during rotation of the door plate 20. Further, in the chute frame 10 having the corrugated cross-section, the first side section 41 of the scrim 40 is also located at an inner center of the chute frame 10, so that a contact area between the first side section 41 of the scrim 40 and the chute frame 10 further increases, thereby providing further increased coupling strength therebetween. As a result, it is possible to prevent separation of the first side section 41 of the scrim 40 from the chute frame 10 upon deployment of the air-bag 50 at high temperatures.

The door plate 20 has a corrugated cross-section. With this configuration, the door plate 20 has improved strength over the case where the door plate has a planar cross-section and is not easily damaged upon impact due to deployment of the air-bag 50.

Further, in the door plate 20 having the corrugated cross-section, the second side section 43 of the scrim 40 is also located at an inner center of the door plate 20, so that a contact area between the second side section 43 of the scrim 40 and the door plate 20 further increases, thereby providing further increased coupling strength therebetween. As a result, it is possible to prevent separation of the second side section 43 of the scrim 40 from the door plate 20 upon deployment of the air-bag 50 at high temperatures.

Figure 12:
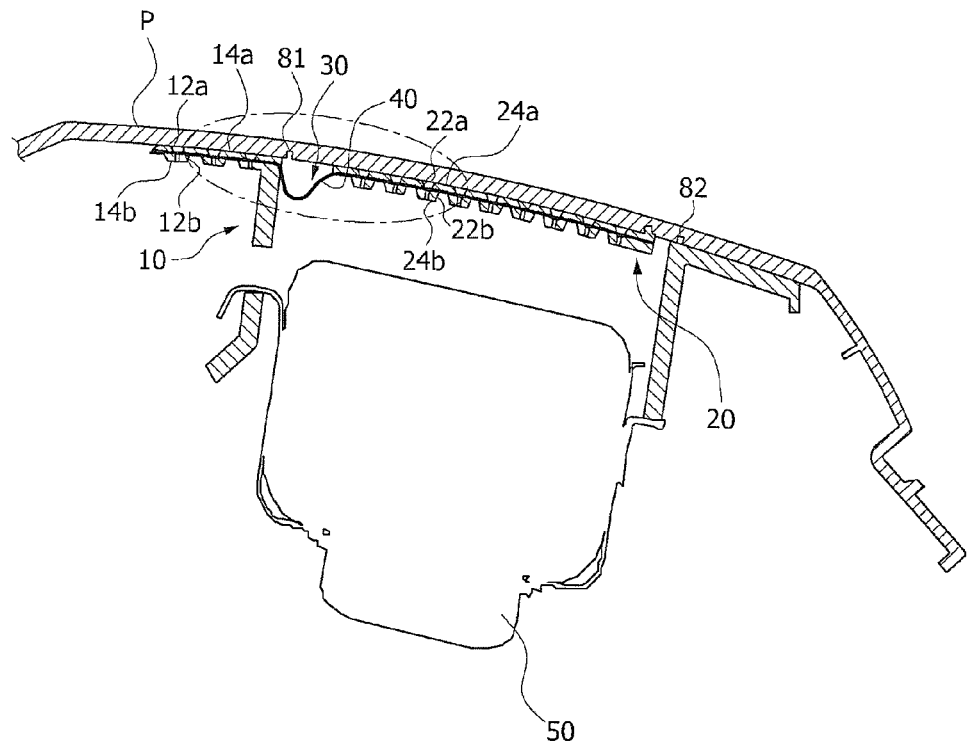
FIG. 12 is a cross-sectional view of a passenger air-bag door according to a further exemplary embodiment of the present disclosure.
Figure 13:
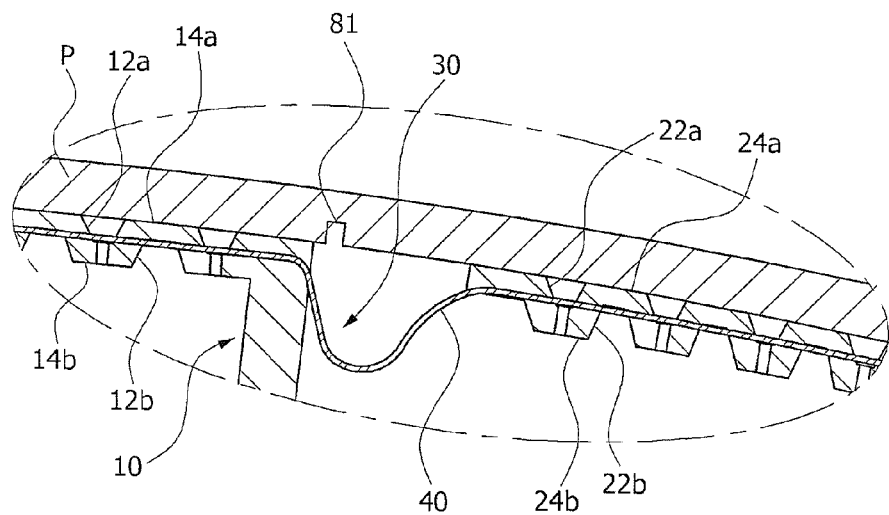
FIG. 13 is a partially enlarged view of the passenger air-bag door of FIG. 12.

FIGS. 12 and 13 illustrate a passenger air-bag door according to a further exemplary embodiment. The passenger air-bag door of this embodiment has the same configuration as that of the above embodiment except for a chute frame 10 and a door plate 20.

Referring to FIGS. 12 and 13, the chute frame 10 has a corrugated cross-section, in which the chute frame 10 is formed at an upper side thereof with a plurality of upper valleys 12a and upper peaks 14a and at a lower side thereof with a plurality of lower peaks 14b and lower valleys 12b respectively corresponding to the upper valleys 12a and upper peaks 14a. With this configuration, the chute frame 10 has improved strength over the case where the chute frame has a planar cross-section and is not easily bent in one direction by impact during rotation of the door plate 20.

Differently from the chute frame 10 having the corrugated cross-section, a first side section 41 of the scrim 40 is planar from one end to the other end and is disposed horizontally in the chute frame 10. Therefore, the first side section 41 of the scrim 40 is exposed upwards at the upper valleys 12a and exposed downwards at the lower valleys 12b.

With this configuration, during deployment of the air-bag 50 at high temperatures, the upper peaks 14a prevent the first side section 41 of the scrim 40 from being separated upwards from the chute frame 10 and the lower peaks 12b prevent the first side section 41 of the scrim 40 from being separated downwards therefrom.

The first side section 41 of the scrim 40 is exposed outside by a frame mold 61/66 disposed at one side to form one side of the chute frame 10 and by frame protrusions 67/62 protruding from a frame mold 66/61 disposed at the other side to form the other side of the chute frame 10.

Figure 16:
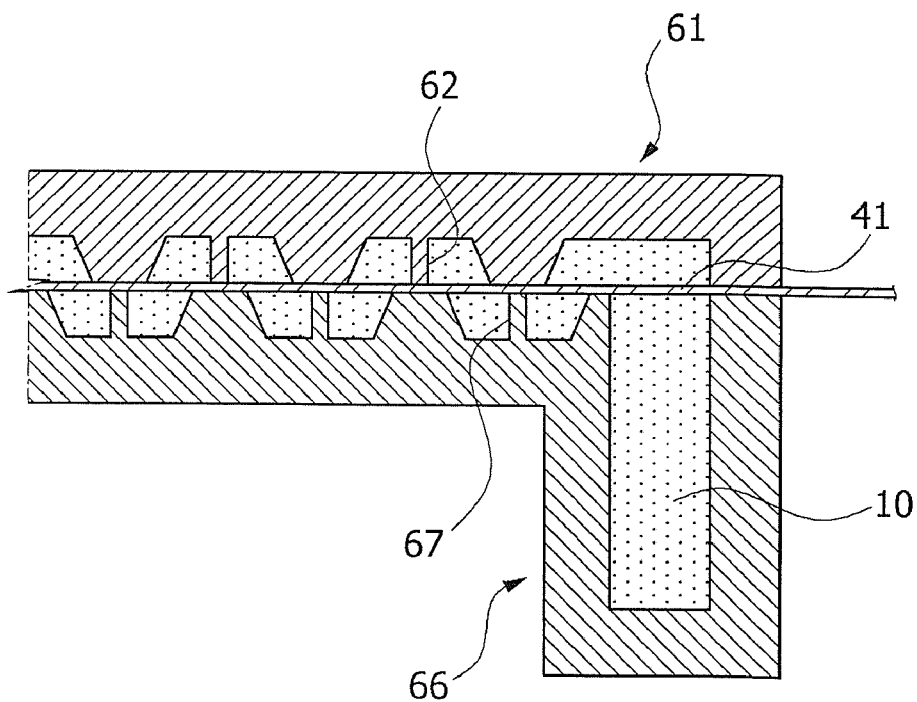
FIG. 16 is a cross-sectional view of a scrim provided to the chute frame by insert-injection molding, according to another exemplary embodiment of the present disclosure.

Referring to FIG. 16, the first side section 41 of the scrim 40 is exposed upwards by a lower surface of the upper frame mold 61, which forms an upper side of the chute frame 10, and by the lower frame protrusions 67 protruding upwards from the lower frame mold 66, which forms a lower side of the chute frame 10. Further, the first side section 41 of the scrim 40 is exposed downwards on an upper surface of the lower frame mold 66, which forms the lower side of the chute frame 10, and on the upper frame protrusions 62 protruding downwards from the upper frame mold 61, which forms the upper side of the chute frame 10.

Referring to FIGS. 12 and 13, the door plate 20 has a corrugated cross-section, in which the door plate 20 is provided at an upper side thereof with a plurality of upper valleys 22a and upper peaks 24a and at a lower side thereof with a plurality of lower peaks 24b and lower valleys 22b respectively corresponding to the upper valleys 22a and upper peaks 24a. With this configuration, the door plate 20 has improved strength over the case where the door plate has a planar cross-section and is not easily bent in one direction by impact due to deployment of the air-bag 50.

Differently from the door plate 20 having the corrugated cross-section, a second side section 43 of the scrim 40 is planar from one end to the other end and is disposed horizontally in the door plate 20. Therefore, the second side section 43 of the scrim 40 is exposed upwards at the upper valleys 22a and exposed downwards at the lower valleys 22b.

With this configuration, during deployment of the air-bag 50 at high temperatures, the upper peaks 24a prevent the second side section 43 of the scrim 40 from being separated upwards from the door plate 20 and the lower peaks 22b prevent the second side section 43 of the scrim 40 from being separated downwards therefrom.

The second side section 43 of the scrim 40 is exposed outside by a door mold 71/76 disposed at one side to form one side of the door plate 20, and by door protrusions 77/72 protruding from a door mold 76/71 disposed at the other side to form the other side of the door plate 20.

Figure 17:
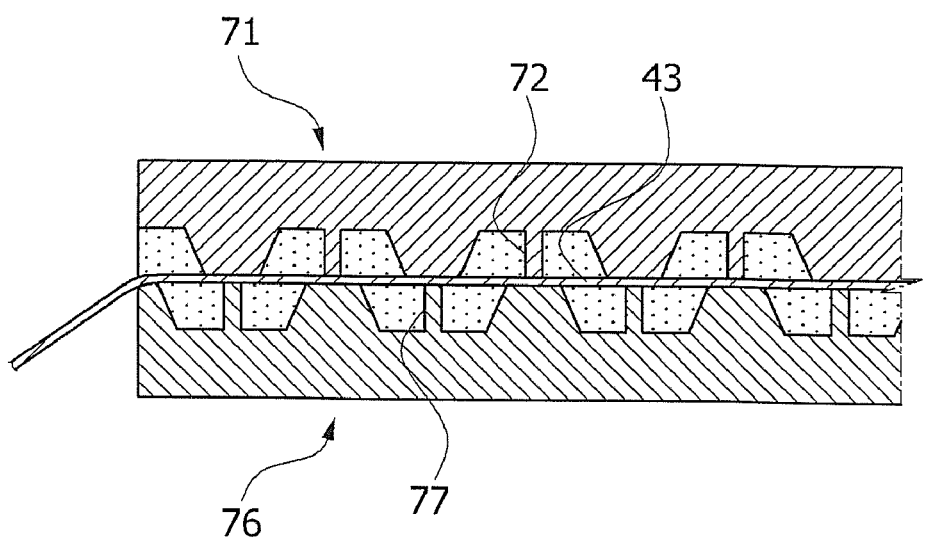
FIG. 17 is a cross-sectional view of the scrim provided to the door plate by insert-injection molding, according to the other exemplary embodiment of the present disclosure.

Referring to FIG. 17, the second side section 43 of the scrim 40 is exposed upwards by a lower surface of the upper door mold 71, which forms an upper side of the door plate 20, and by the lower door protrusions 77 protruding upwards from the lower door mold 76, which forms a lower side of the door plate 20. Further, the second side section 43 of the scrim 40 is exposed downwards on an upper surface of the lower door mold 76, which forms the lower side of the door plate 20, and on the upper door protrusions 72 protruding downwards from the upper door mold 71, which forms the upper side of the door plate 20.

As such, in the passenger air-bag door according to the embodiments, the hinge part is composed of a scrim, thereby preventing damage of the hinge part when the door plate is rotated open.

According to the embodiments, the passenger air-bag door enables complete rotational opening of the door plate while preventing damage of the hinge part, thereby enhancing deployment performance of the passenger air-bag door.

According to the embodiments, the hinge part is composed of the scrim, thereby reducing manufacturing costs and weight of the passenger air-bag door.

Although some embodiments have been described in the present disclosure, it should be understood by those skilled in the art that these embodiments are given by way of illustration only, and that various modifications, variations, and alterations can be made without departing from the spirit and scope of the present disclosure. Further, the description of the passenger air-bag door as provided herein is merely an example of the present disclosure and the subject matter of the present disclosure can be applied to other products. The scope of the present disclosure should be limited only by the accompanying claims and equivalents thereof.

What is claimed is:

1. A passenger air-bag door comprising:
   a chute frame located in an instrument panel;
   a door plate located in an opening of the chute frame; and
   a hinge part rotatably connecting the door plate to the chute frame and comprising a scrim,
   wherein the scrim comprises a first side section provided to the chute frame by insert-injection molding, a second side section provided to the door plate by insert-injection molding, and a middle section between the first side section and the second side section constituting the hinge part, and
   wherein the chute frame comprises upper and lower valleys to form a corrugated cross-section, and the first side section of the scrim is exposed outside at the upper and lower valleys.

2. The passenger air-bag door of claim 1, wherein the first side section of the scrim has a greater width than the middle section of the scrim.

3. The passenger air-bag door claim 1, wherein the first side section of the scrim is located at an inner center of the chute frame.

4. The passenger air-bag door of claim 3, wherein the first side section of the scrim is located at the inner center of the chute frame by an upper frame protrusion protruding from an upper frame mold forming an upper side of the chute frame and a lower frame protrusion protruding from a lower frame mold forming a lower side of the chute frame.

5. The passenger air-bag door of claim 3, wherein the chute frame has a corrugated cross-section.

6. The passenger air-bag door of claim 1, wherein the first side section of the scrim is exposed to an outside of the chute frame by a frame mold disposed at one side to form one side of the chute frame and by a protrusion protruding from a frame mold disposed at the other side to form the other side of the chute frame.

7. The passenger air-bag door of claim 1, wherein the second side section of the scrim is located at an inner center of the door plate.

8. The passenger air-bag door of claim 7, wherein the second side section of the scrim is located at the inner center of the door plate by an upper door protrusion protruding from an upper door mold forming an upper side of the door plate and a lower door protrusion protruding from a lower door mold forming a lower side of the door plate.

9. The passenger air-bag door of claim 7, wherein the door plate has a corrugated cross-section.

10. The passenger air-bag door of claim 1, wherein the door plate comprises upper and lower valleys to form a corrugated cross-section, and the second side section of the scrim is exposed upwards at the upper valleys and exposed downwards at the lower valleys.

11. The passenger air-bag door of claim 10, wherein the second side section of the scrim is disposed inside of the door plate wherein a door mold disposed at one side forms one side of the door plate and wherein a door protrusion protruding from a door mold disposed at the other side forms the other side of the door plate.

12. The passenger air-bag door of claim 1, wherein the door plate is made of a different material than the chute frame.

13. The passenger air-bag door of claim 12, wherein the door plate is made of a softer material than the chute frame.

14. The passenger air-bag door of claim 1, wherein the hinge part has a length (H) greater than or equal to the sum of a distance (A1) from the first side section of the scrim to an upper side of the chute frame, a thickness (A2) of the instrument panel at a side of the chute frame, a distance (B1) from the second side section of the scrim to an upper side of the door plate, and a thickness (B2) of the instrument panel at a side of the door plate.

15. The passenger air-bag door of claim 1, wherein the sum of a length (H) of the hinge part and a length (D) of the door plate is less than the sum of a distance (A1)) from the first side section of the scrim to an upper side of the chute frame, a thickness (A2) of the instrument panel at a side of the chute frame, and a distance (C) from a first cutting groove to a front windshield glass.

16. The passenger air-bag door of claim 1, wherein the scrim comprises polyester.

17. The passenger air-bag door of claim 1, wherein the scrim comprises nylon.

* * * * *